(12) United States Patent
Iso et al.

(10) Patent No.: US 12,241,388 B2
(45) Date of Patent: Mar. 4, 2025

(54) ROTOR AND AIRCRAFT

(71) Applicant: HONDA MOTOR CO., LTD., Tokyo (JP)

(72) Inventors: Tomoyuki Iso, Wako (JP); Yuji Ishitsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/432,130

(22) Filed: Feb. 5, 2024

(65) Prior Publication Data

US 2024/0271538 A1    Aug. 15, 2024

(30) Foreign Application Priority Data

Feb. 9, 2023   (JP) .................... 2023-018263

(51) Int. Cl.
*B64C 27/48*    (2006.01)
*B64C 27/58*    (2006.01)
*F01D 5/30*    (2006.01)

(52) U.S. Cl.
CPC ............ *F01D 5/30* (2013.01); *B64C 27/48* (2013.01); *B64C 27/58* (2013.01); *F05D 2260/31* (2013.01)

(58) Field of Classification Search
CPC ................ B64C 27/32; B64C 27/48
See application file for complete search history.

(56) References Cited

U.S. PATENT DOCUMENTS

| | | | | |
|---|---|---|---|---|
| 2,830,669 A | * | 4/1958 | Klockner | B64C 27/54 416/163 |
| 4,304,525 A | * | 12/1981 | Mouille | B64C 27/51 416/134 A |
| 10,518,867 B2 | | 12/2019 | Parham, Jr. et al. | |
| 10,773,798 B2 | * | 9/2020 | Haldeman | B64C 27/48 |

\* cited by examiner

*Primary Examiner* — Christopher R Legendre
(74) *Attorney, Agent, or Firm* — Rankin, Hill & Clark LLP

(57) ABSTRACT

A rotor includes a rotatable hub, blades, and two coupling members, namely, a first coupling member and a second coupling member that couple each blade and the hub. The longitudinal directions of the first coupling member and the second coupling member lie along a tangential direction of a rotation trajectory of the hub, and the first coupling member and the second coupling member are spaced apart from each other in a radial direction of the rotation trajectory.

4 Claims, 7 Drawing Sheets

ROTOR AND AIRCRAFT

CROSS-REFERENCE TO RELATED APPLICATIONS

This application is based upon and claims the benefit of priority from Japanese Patent Application No. 2023-018263 filed on Feb. 9, 2023, the contents of which are incorporated herein by reference.

BACKGROUND OF THE INVENTION

Field of the Invention

The present invention relates to a rotor and an aircraft.

Description of the Related Art

U.S. Pat. No. 10,518,867 B2 discloses a rotor of an aircraft.

SUMMARY OF THE INVENTION

In the technique disclosed in U.S. Pat. No. 10,518,867 B2, each blade and the hub are coupled by one pin, and therefore the blade can pivot about the flapping axis. Flapping of the blades causes the thrust of the rotor to fluctuate. Therefore, even if an attempt is made to control the thrust by changing the rotational speed of the rotor and the pitch angle of the blades, the thrust fluctuates due to flapping, and therefore, there is a problem in that the responsiveness of the thrust control is low.

An object of the present invention is to solve the above-mentioned problem.

According to a first aspect of the present invention, there is provided a rotor comprising a hub configured to rotate; a blade; and a plurality of coupling members configured to couple the blade and the hub to each other, wherein a longitudinal direction of each of the coupling members lies along a tangential direction of a rotation trajectory of the hub, and a first coupling member of the plurality of coupling members and a second coupling member of the plurality of coupling members are spaced apart from each other in a radial direction of the rotation trajectory.

According to a second aspect of the present invention, there is provided an aircraft comprising the rotor according to the first aspect.

According to the present invention, the thrust responsiveness can be improved.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

Configuration of Aircraft

Figure 1:
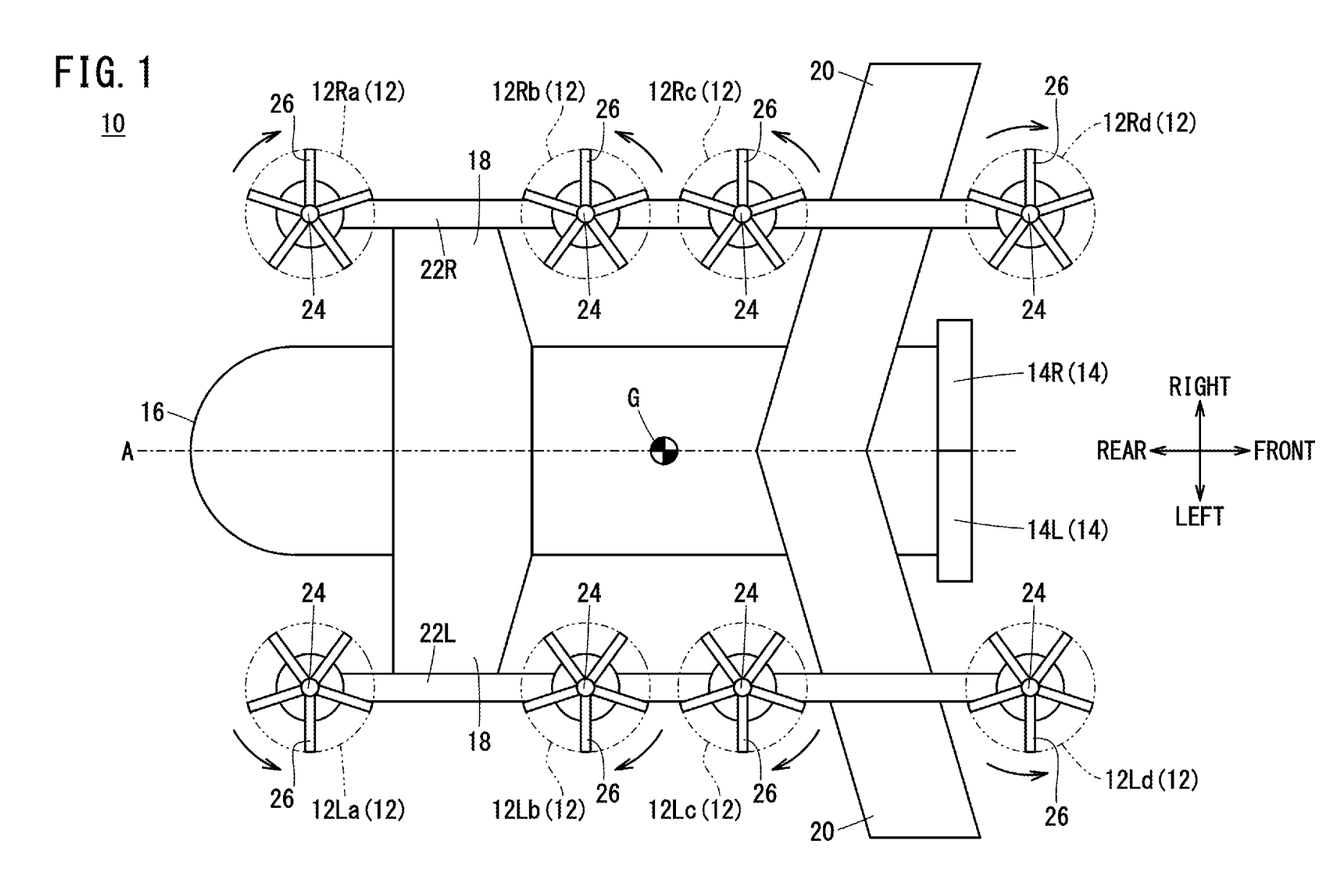
FIG. 1 is a schematic view of an aircraft.

FIG. 1 is a schematic view of an aircraft 10. The aircraft 10 of the present embodiment is an electric vertical take-off and landing aircraft (eVTOL aircraft). The aircraft 10 includes eight VTOL rotors 12 and two cruise rotors 14. The VTOL rotors 12 generate lift thrust for moving a fuselage 16 upward. The cruise rotors 14 generate cruise thrust for moving the fuselage 16 forward.

The aircraft 10 includes the fuselage 16. The fuselage 16 includes a cockpit, a cabin, and the like. A pilot rides in the cockpit and controls the aircraft 10. Passengers and the like ride in the cabin. The aircraft 10 may be automatically controlled without a pilot aboard.

The aircraft 10 includes a front wing 18 and a rear wing 20, which are fixed wings. In a case where the fuselage 16 has an airspeed, lift is generated in the front wing 18 and the rear wing 20.

A boom 22L and a boom 22R are attached to each of the front wing 18 and the rear wing 20. The boom 22L is attached to the left side of the fuselage 16, and the boom 22R is attached to the right side of the fuselage 16. The longitudinal direction of the boom 22L and the longitudinal direction of the boom 22R lie along the front-rear direction of the fuselage 16.

In FIG. 1, the boom 22L and the boom 22R have a shape linearly extending in the front-rear direction of the fuselage 16. However, the boom 22L and the boom 22R may be formed in an arc shape protruding outward in the left-right direction of the fuselage 16.

As mentioned above, the aircraft 10 includes eight VTOL rotors 12. The eight VTOL rotors 12 are a rotor 12La, a rotor 12Lb, a rotor 12Lc, a rotor 12Ld, a rotor 12Ra, a rotor 12Rb, a rotor 12Rc, and a rotor 12Rd. Each of the VTOL rotors 12 corresponds to a rotor of the present invention.

The rotor 12La, the rotor 12Lb, the rotor 12Lc, and the rotor 12Ld are attached to the boom 22L. The rotor 12Ra, the rotor 12Rb, the rotor 12Rc, and the rotor 12Rd are attached to the boom 22R.

A drive shaft 24 of each VTOL rotor 12 extends in the up-down direction of the fuselage 16. The drive shaft 24 of each VTOL rotor 12 may be angled (canted) a few degrees with respect to the up-down direction.

The lift thrust of each VTOL rotor 12 is controlled by adjusting the rotational speed of the VTOL rotor 12 and the pitch angle of blades 26. By controlling the lift thrust of each VTOL rotor 12, it is possible to apply a roll moment, a pitch moment, and a yaw moment to the fuselage 16.

As mentioned above, the aircraft 10 includes two cruise rotors 14. The two cruise rotors 14 are a rotor 14L and a rotor 14R. The rotor 14L and the rotor 14R are attached to a rear portion of the fuselage 16.

A drive shaft (not shown) of each cruise rotor 14 extends in the front-rear direction of the fuselage 16. The drive shaft of each cruise rotor 14 may be angled (canted) a few degrees with respect to the front-rear direction.

The cruise thrust of each cruise rotor 14 is controlled by adjusting the rotational speed of the cruise rotor 14 and the pitch angle of the blades 26.

Structure of Rotor

Figure 2:
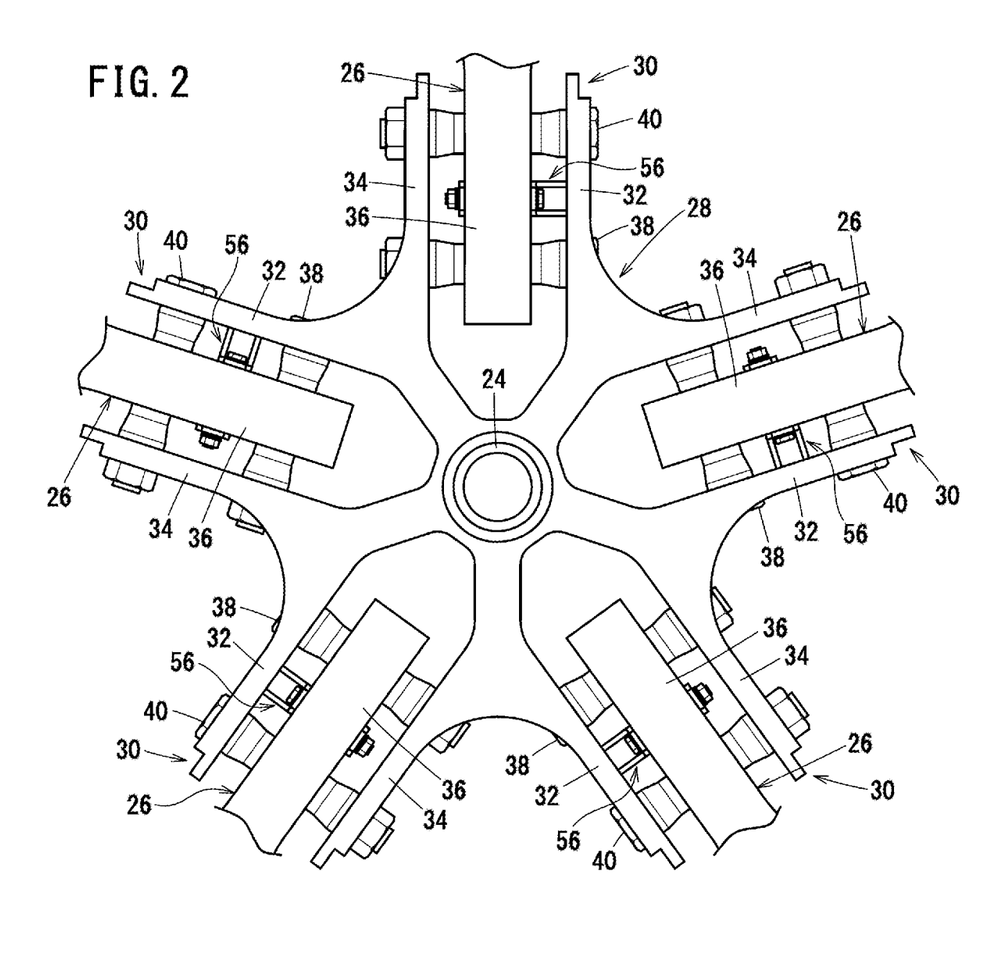
FIG. 2 is a view showing a coupling portion between a hub and blades of a VTOL rotor.
Figure 3:
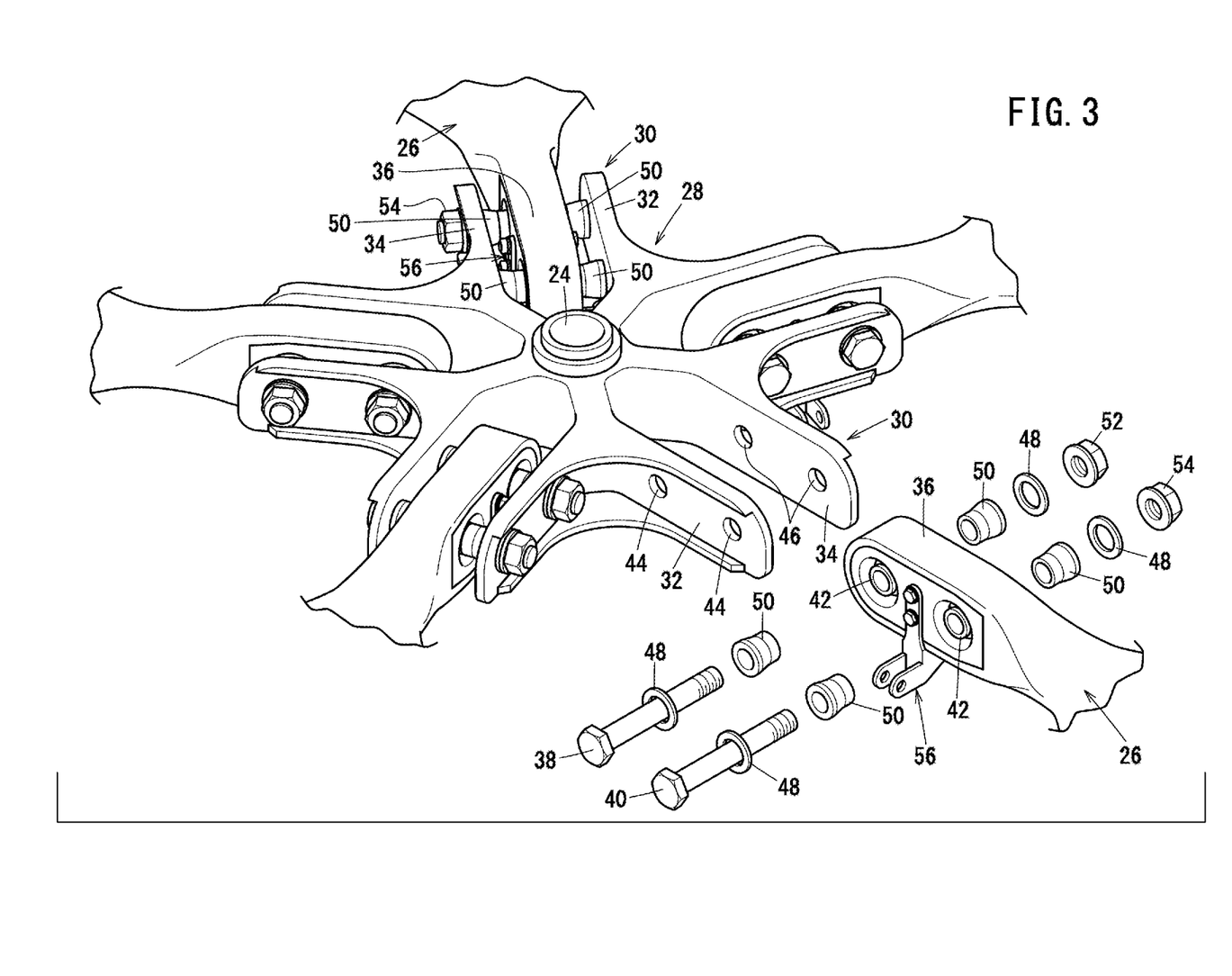
FIG. 3 is a view for explaining a method for coupling the hub and the blades.
Figure 4:
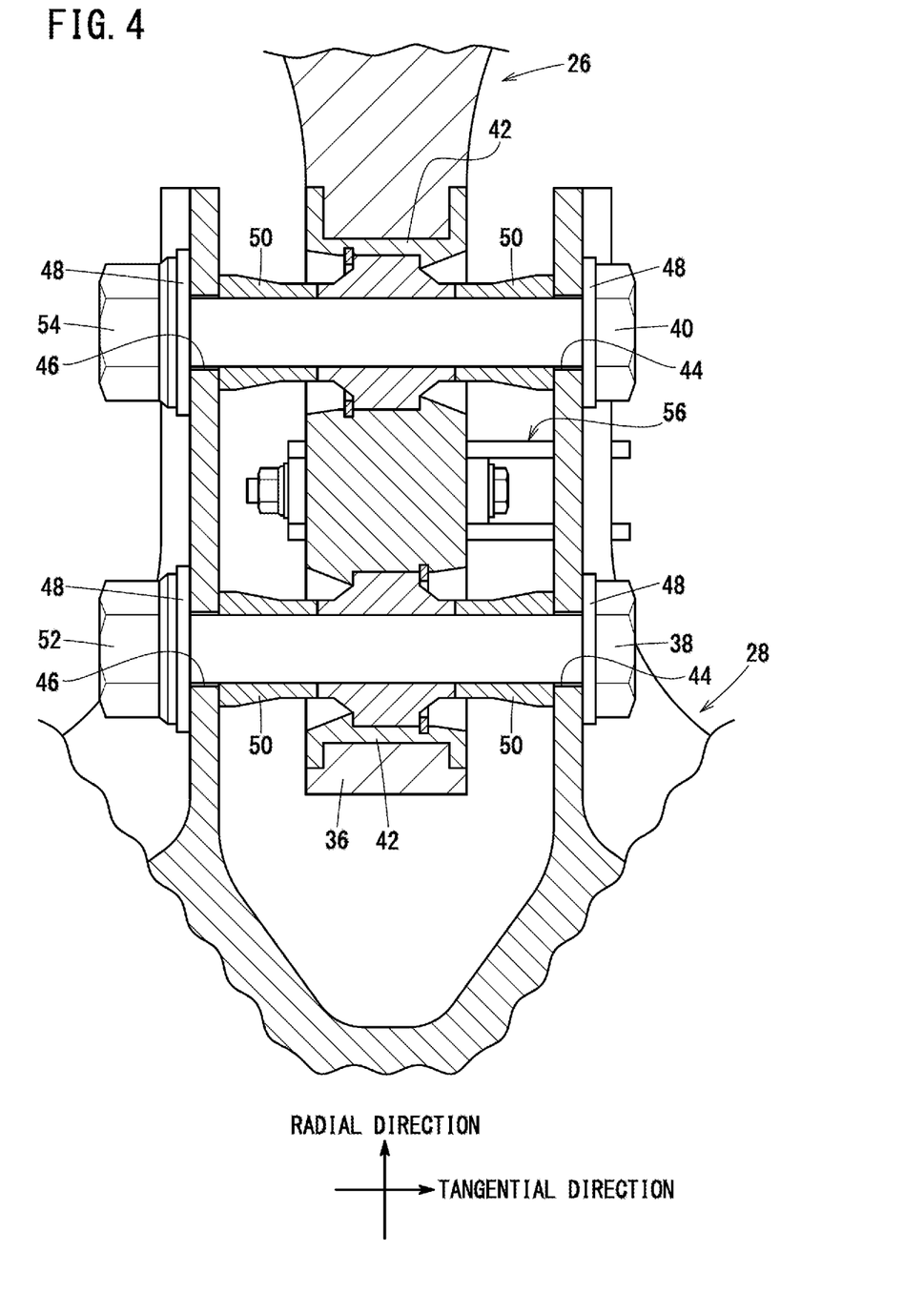
FIG. 4 is an enlarged cross-sectional view of the coupling portion between the hub and the blade.

FIG. 2 is a view showing a coupling portion between a hub 28 and the blades 26 of the VTOL rotor 12. FIG. 2 is a view seen from the direction in which the drive shaft 24 extends. FIG. 3 is a view for explaining a method for coupling the hub 28 and the blades 26. FIG. 4 is an enlarged cross-sectional view of the coupling portion between the hub 28 and the blade 26.

The hub 28 is attached to the drive shaft 24 and rotates with the drive shaft 24. The hub 28 includes five forks 30. Each fork 30 is formed in a U-shape and includes a first arm 32 and a second arm 34 which are bifurcated. Each blade 26 includes a blade root section 36 inserted between the first arm 32 and the second arm 34, and is coupled to the fork 30 by a first knock bolt 38 and a second knock bolt 40. The first knock bolt 38 corresponds to a coupling member and a first coupling member of the present invention. The second knock bolt 40 corresponds to a coupling member and a second coupling member of the present invention.

Each VTOL rotor 12 of the present embodiment includes five blades 26, but the number of the blades 26 may be greater than five. Alternatively, the number of the blades 26 may be less than five. The number of the forks 30 is not limited to five, and the number of the provided forks 30 corresponds to the number of the blades 26.

Two spherical plain bearings 42 are attached to the blade root section 36. The two spherical plain bearings 42 are spaced apart from each other in the radial direction of a rotation trajectory of the VTOL rotor 12.

Two bolt holes 44 are formed in the first arm 32. The two bolt holes 44 are spaced apart from each other in the radial direction of a rotation trajectory of the hub 28. Two bolt holes 46 are formed in the second arm 34. The two bolt holes 46 are spaced apart from each other in the radial direction of the rotation trajectory of the hub 28.

The first knock bolt 38 is inserted into a washer 48, the bolt hole 44 of the first arm 32, a collar 50, the spherical plain bearing 42, the collar 50, the bolt hole 46 of the second arm 34, and the washer 48 in this order. A first lock nut 52 is screwed onto the tip of the first knock bolt 38. In this state, the longitudinal direction of the first knock bolt 38 lies along the tangential direction of the rotation trajectory of the hub 28.

The second knock bolt 40 is inserted into the washer 48, the bolt hole 44 of the first arm 32, the collar 50, the spherical plain bearing 42, the collar 50, the bolt hole 46 of the second arm 34, and the washer 48 in this order. A second lock nut 54 is screwed onto the tip of the second knock bolt 40. In this state, the longitudinal direction of the second knock bolt 40 lies along the tangential direction of the rotation trajectory of the hub 28.

The blade 26 is supported by the first knock bolt 38 and the second knock bolt 40 via the spherical plain bearings 42 at two positions spaced apart from each other in the radial direction of the rotation trajectory of the hub 28. As a result, the blade root section 36 of the blade 26 can perform a feathering motion about a straight line connecting the two support points as a rotation axis, but is restricted from performing a flapping motion and a dragging motion about lines intersecting the straight line connecting the two support points as rotation axes.

Figure 5:
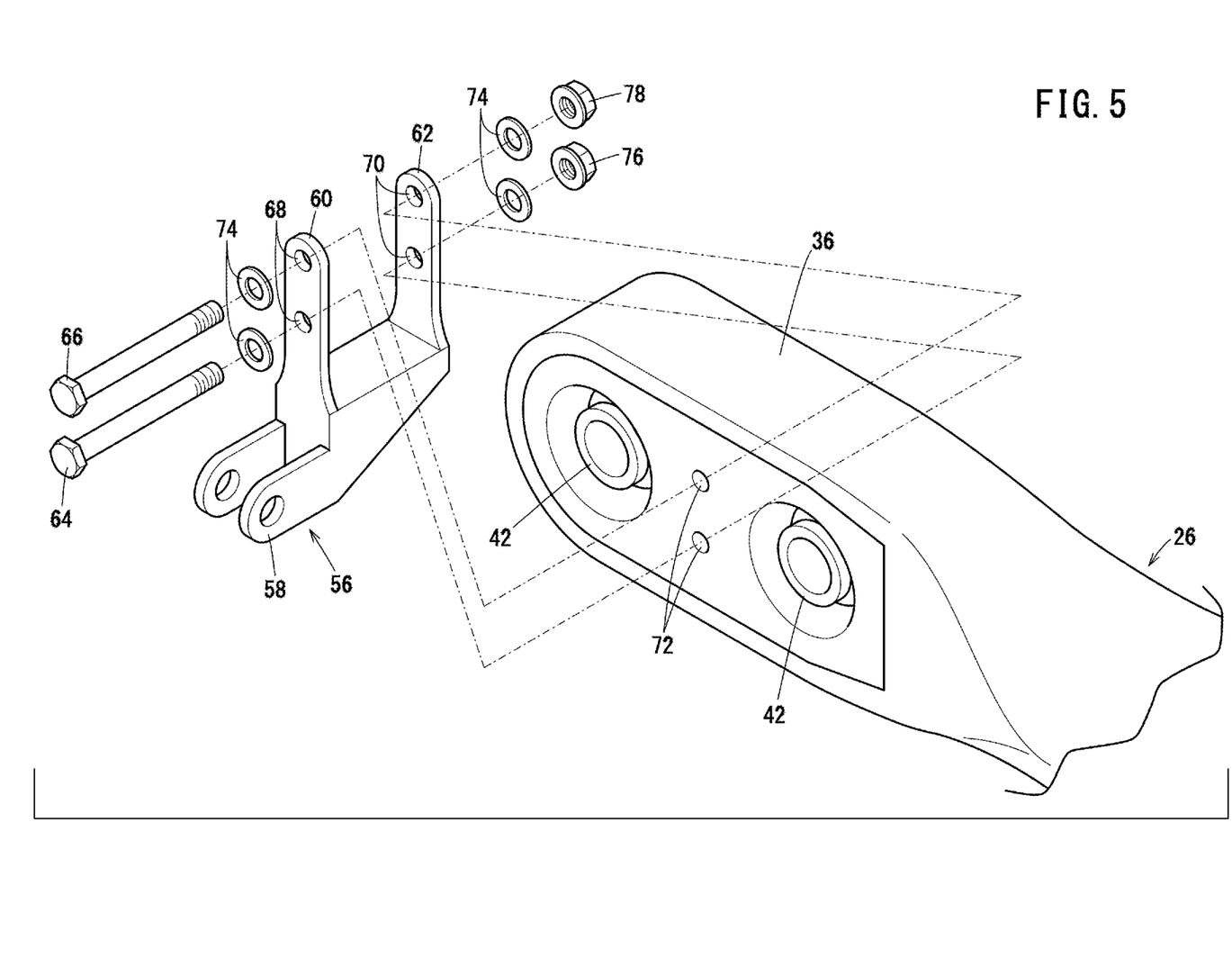
FIG. 5 is a view for explaining a method for coupling the blade and a link.
Figure 6:
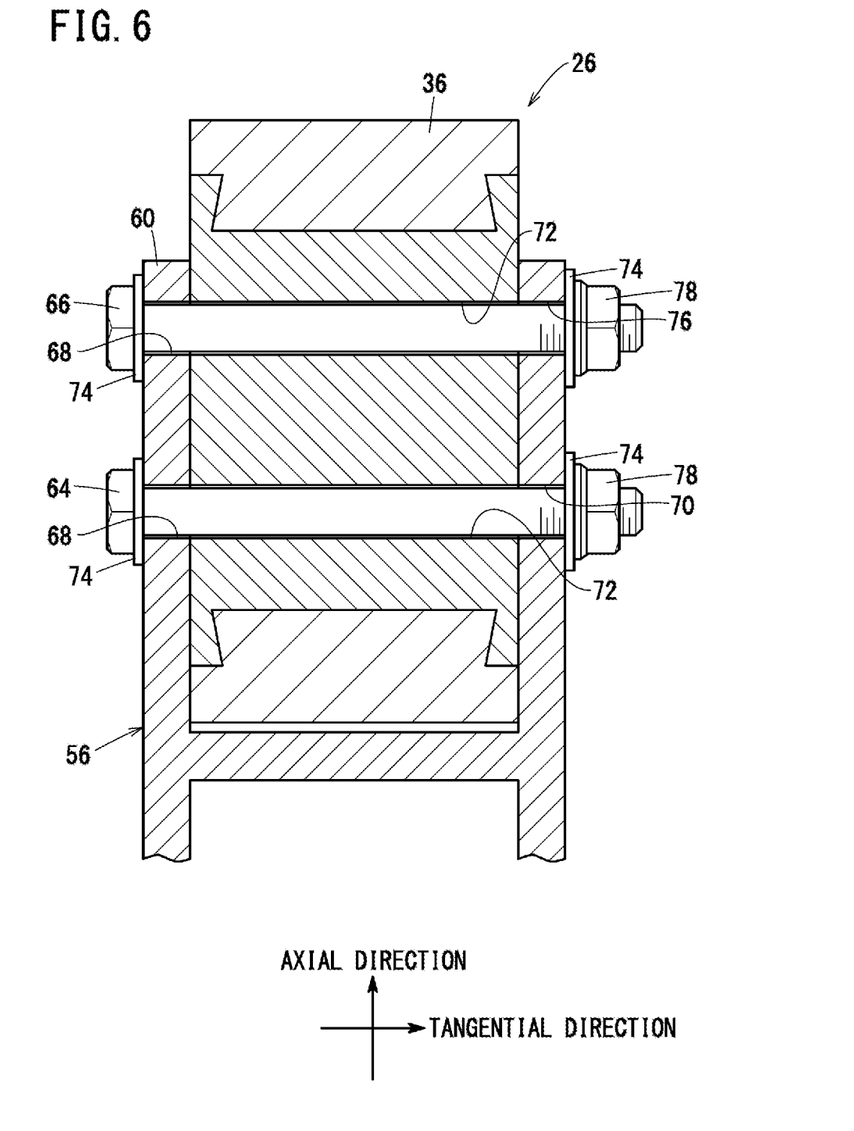
FIG. 6 is an enlarged cross-sectional view of a coupling portion between the blade and the link.

FIG. 5 is a view for explaining a method for coupling the blade 26 and a link 56. FIG. 6 is an enlarged cross-sectional view of a coupling portion between the blade 26 and the link 56.

The link 56 rotates the blade 26 about the feathering axis to change the pitch angle of the blade 26. The feathering axis is a line passing through the centers of the two spherical plain bearings 42. The link 56 includes a rod attachment portion 58. A pitch rod (not shown) is attached to the rod attachment portion 58. The pitch rod pushes up the rod attachment portion 58 or pulls the rod attachment portion 58, and the link 56 rotates the blade 26.

The link 56 is formed in a U-shape and includes a third arm 60 and a fourth arm 62 which are bifurcated. The blade root section 36 of the blade 26 is inserted between the third arm 60 and the fourth arm 62, and the blade 26 is coupled to the link 56 by a third knock bolt 64 and a fourth knock bolt 66.

Two bolt holes 68 are formed in the third arm 60. The two bolt holes 68 are spaced apart from each other in the axial direction of the drive shaft 24. Two bolt holes 70 are formed in the fourth arm 62. The two bolt holes 70 are spaced apart from each other in the axial direction of the drive shaft 24.

Two through holes 72 are formed in the blade root section 36 of the blade 26. The two through holes 72 are spaced apart from each other in the rotational axis direction of the drive shaft 24. The two through holes 72 are located between the two spherical plain bearings 42.

The third knock bolt 64 is inserted into a washer 74, the bolt hole 68 of the third arm 60, the through hole 72 of the blade root section 36, the bolt hole 70 of the fourth arm 62, and the washer 74 in this order. A third lock nut 76 is screwed onto the tip of the third knock bolt 64. In this state, the longitudinal direction of the third knock bolt 64 lies along the tangential direction of the rotation trajectory of the hub 28.

The fourth knock bolt 66 is inserted into the washer 74, the bolt hole 68 of the third arm 60, the through hole 72 of the blade root section 36, the bolt hole 70 of the fourth arm 62, and the washer 74 in this order. A fourth lock nut 78 is screwed onto the tip of the fourth knock bolt 66. In this state, the longitudinal direction of the fourth knock bolt 66 lies along the tangential direction of the rotation trajectory of the hub 28.

Thus, as shown in FIG. 2, the link 56 is attached to the blade 26 between the first knock bolt 38 and the second knock bolt 40.

Although the structure of the VTOL rotor 12 has been described above, a similar structure may be applied to the cruise rotor 14.

Advantageous Effects

In a case where the VTOL rotor 12 rotates, a resultant force of the lift and the centrifugal force acts on each blade 26, and the blade 26 flaps upward. The resultant force acting on each blade 26 is applied to a coupling portion between the blade root section 36 and the hub 28.

Flapping of the blades 26 causes the lift thrust of the VTOL rotor 12 to fluctuate. Therefore, even if an attempt is made to change the lift thrust to a target value by changing the rotational speed of the VTOL rotor 12 and the pitch angle of the blades 26, the lift thrust fluctuates due to flapping, and therefore, it takes time for the lift thrust to reach the target value, and the responsiveness of the lift thrust control is low.

In the VTOL rotor 12 of the present embodiment, each blade 26 and the hub 28 are coupled to each other by two bolts, namely, the first knock bolt 38 and the second knock bolt 40. The longitudinal direction of the first knock bolt 38 and the longitudinal direction of the second knock bolt 40 lie along the tangential direction of the rotation trajectory of the hub 28. Further, the first knock bolt 38 and the second knock bolt 40 are spaced apart from each other in the radial direction of the rotation trajectory of the hub 28.

As a result, the blade root section 36 is restricted from pivoting about the first knock bolt 38, and is restricted from pivoting about the second knock bolt 40. Therefore, in the VTOL rotor 12, flapping of the blades 26 can be suppressed. As a result, the time required for the lift thrust to reach the target value can be shortened, and the responsiveness of the lift thrust control can be improved.

In the VTOL rotor 12 of the present embodiment, the spherical plain bearing 42 is provided between the first knock bolt 38 and the blade root section 36, and the spherical plain bearing 42 is provided between the second knock bolt 40 and the blade root section 36. As a result, the blade root section 36 is supported so as to be feathered. Therefore, the VTOL rotor 12 can change the pitch angle of each blade 26.

The spherical plain bearing 42 is smaller and lighter than a ball bearing, or a roller bearing such as a cylindrical roller bearing. However, the spherical plain bearing 42 has a lower tolerance for a load in the axial direction than the cylindrical roller bearing.

In the VTOL rotor 12 of the present embodiment, the resultant force acting on each blade 26 acts on the spherical plain bearing 42 in the radial direction. Therefore, it is possible to use the spherical plain bearing 42 whose size is small. This allows the size of the coupling portion between the hub 28 and each blade 26 to be reduced. In addition, the weight of the VTOL rotor 12 can be reduced.

The position where the link 56 is attached to the blade 26 may be a position on the inner side of the first knock bolt 38 in the radial direction of the rotation trajectory of the hub 28. However, on the inner side of the first knock bolt 38, there is little space for the link 56 to be attached to the blade 26.

The position where the link 56 is attached to the blade 26 may be a position on the outer side of the second knock bolt 40 in the radial direction of the rotation trajectory of the hub 28. The upper side of the coupling portion between the hub 28 and the blade 26, and the upper side of the coupling portion between the link 56 and the blade 26 are covered by a cover (not shown). In a case where the link 56 is attached to the blade 26 at a position on the outer side of the second knock bolt 40, the size of the cover increases. When the aircraft 10 is flying, the cover causes drag, and it is therefore desirable to make the size of the cover as small as possible.

In the VTOL rotor 12 of the present embodiment, the link 56 is attached to the blade 26 between the first knock bolt 38 and the second knock bolt 40. In order to suppress the feathering of the blade 26, it is necessary to secure a distance between the first knock bolt 38 and the second knock bolt 40. In the VTOL rotor 12 of the present embodiment, a space between the first knock bolt 38 and the second knock bolt 40 is utilized as a position where the link 56 is attached to the blade 26. In addition, the VTOL rotor 12 enables the size of the cover to be reduced, and enables drag during flight of the aircraft 10 to be reduced.

Second Embodiment

Figure 7:
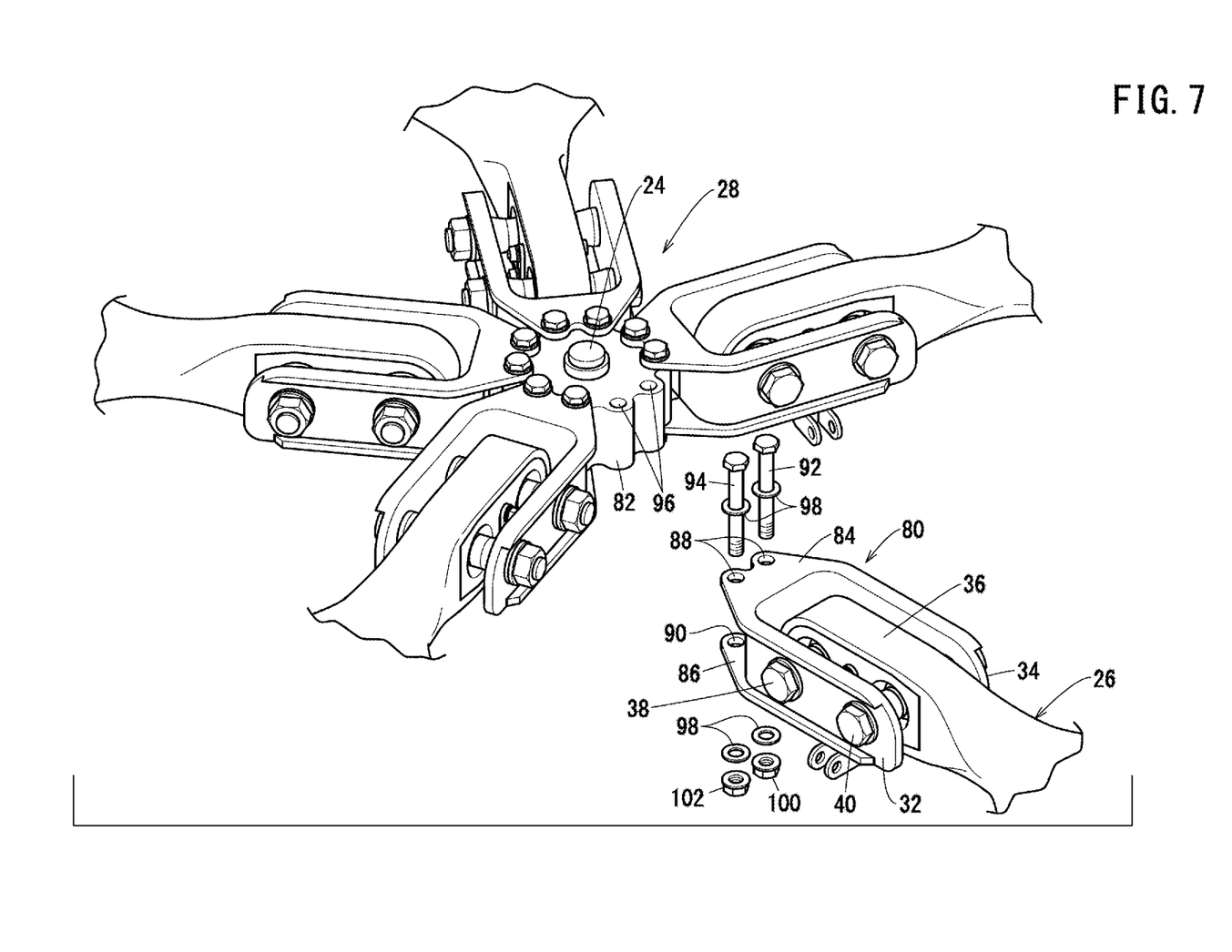
FIG. 7 is a perspective view of the VTOL rotor.

FIG. 7 is a perspective view of the VTOL rotor 12. In the VTOL rotor 12 of the first embodiment, the hub 28 is constituted by one member. In contrast, in the VTOL rotor 12 of the second embodiment, the hub 28 is constituted by a plurality of separable members.

The hub 28 includes five partial hubs 80 and one center hub 82. Each partial hub 80 is formed in a U-shape and includes the first arm 32 and the second arm 34 which are bifurcated. The blade root section 36 of the blade 26 is inserted between the first arm 32 and the second arm 34, and the blade 26 is coupled to the partial hub 80 by the first knock bolt 38 and the second knock bolt 40.

The partial hub 80 includes a fifth arm 84 and a sixth arm 86 which are bifurcated. Two bolt holes 88 are formed in the fifth arm 84. The two bolt holes 88 are spaced apart from each other in the tangential direction of the rotation trajectory of the hub 28. Two bolt holes 90 are formed in the sixth arm 86. The two bolt holes 90 are spaced apart from each other in the tangential direction of the rotation trajectory of the hub 28.

The center hub 82 is attached to the drive shaft 24 and rotates with the drive shaft 24. Each partial hub 80 is attached to the center hub 82. The center hub 82 and each partial hub 80 are fastened by a fifth knock bolt 92 and a sixth knock bolt 94. The center hub 82 is provided with through holes 96 into which the fifth knock bolt 92 and the sixth knock bolt 94 are inserted, respectively.

The fifth knock bolt 92 is inserted into a washer 98, the bolt hole 88 of the fifth arm 84, the through hole 96 of the center hub 82, the bolt hole 90 of the sixth arm 86, and the washer 98 in this order. A fifth lock nut 100 is screwed onto the tip of the fifth knock bolt 92. In this state, the longitudinal direction of the fifth knock bolt 92 lies along the rotation axis of the drive shaft 24.

The sixth knock bolt 94 is inserted into the washer 98, the bolt hole 88 of the fifth arm 84, the through hole 96 of the center hub 82, the bolt hole 90 of the sixth arm 86, and the washer 98 in this order. A sixth lock nut 102 is screwed onto the tip of the sixth knock bolt 94. In this state, the longitudinal direction of the sixth knock bolt 94 lies along the rotation axis of the drive shaft 24.

Advantageous Effects

In the VTOL rotor 12 of the present embodiment, the hub 28 includes the five partial hubs 80 that are separable from each other. Thus, as shown in FIG. 7, after each partial hub 80 and each blade 26 are coupled to each other, the partial hubs 80 and the center hub 82 are fastened to each other. This makes it possible to avoid interference of a tool such as a wrench with the center hub 82 when the blade 26 is fastened to the partial hub 80 by a bolt. Therefore, the VTOL rotor 12 enables the difficulty of the work at the time of assembling the VTOL rotor 12 to be reduced.

Inventions Obtained from Embodiments

The inventions that can be grasped from the above embodiments will be described below.

The rotor (12) includes: the hub (28) configured to rotate, the blade (26), and the plurality of coupling members (38, 40) configured to couple the blade and the hub to each other, wherein the longitudinal direction of each of the coupling members lies along the tangential direction of the rotation trajectory of the hub, and the first coupling member (38) of the plurality of coupling members and the second coupling member (40) of the plurality of coupling members are spaced apart from each other in the radial direction of the rotation trajectory. According to this feature, the rotor can improve the responsiveness of the thrust control.

The above-described rotor may further include the spherical plain bearing (42) between each of the coupling members and the blade. According to this feature, the rotor can change the pitch angle of the blade.

The above-described rotor may further include the link (56) configured to rotate the blade about the feathering axis, and the link may be attached to the blade between the first coupling member and the second coupling member. According to this feature, the rotor enables the size of the cover to be reduced, and enables drag during flight of the aircraft to be reduced.

In the above-described rotor, the blade may be provided in plurality, the hub may include the plurality of partial hubs (80) separable from each other, each of the plurality of blades and each of the plurality of partial hubs may be coupled to each other by the coupling members, and the spherical plain bearing may be provided between each of the coupling members and each of the blades. According to this feature, the rotor enables the difficulty of the work at the time of assembling the rotor to be reduced.

The aircraft (10) includes the above-described rotor. According to this feature, the aircraft can improve the responsiveness of the thrust control.

The present invention is not limited to the above disclosure, and various modifications are possible without departing from the essence and gist of the present invention.

The invention claimed is:

1. A rotor comprising:
a hub configured to rotate;
a blade;
a plurality of coupling members configured to couple the blade and the hub to each other; and
a spherical plain bearing between each of the coupling members and the blade,
wherein a longitudinal direction of each of the coupling members lies along a tangential direction of a rotation trajectory of the hub, and
a first coupling member of the plurality of coupling members and a second coupling member of the plurality of coupling members are spaced apart from each other in a radial direction of the rotation trajectory.

2. An aircraft comprising the rotor according to claim 1.

3. A rotor comprising:
a hub configured to rotate;
a blade;
a plurality of coupling members configured to couple the blade and the hub to each other; and
a link configured to rotate the blade about a feathering axis,
wherein
a longitudinal direction of each of the coupling members lies along a tangential direction of a rotation trajectory of the hub,
a first coupling member of the plurality of coupling members and a second coupling member of the plurality of coupling members are spaced apart from each other in a radial direction of the rotation trajectory, and
the link is attached to the blade between the first coupling member and the second coupling member.

4. A rotor comprising:
a hub configured to rotate;
a plurality of blades; and
a plurality of coupling members configured to couple the plurality of blades and the hub to each other,
wherein
a longitudinal direction of each of the coupling members lies along a tangential direction of a rotation trajectory of the hub, and
a first coupling member of the plurality of coupling members and a second coupling member of the plurality of coupling members are spaced apart from each other in a radial direction of the rotation trajectory,
the hub includes a plurality of partial hubs separable from each other,
each of the plurality of blades and each of the plurality of partial hubs are coupled by the respective coupling members, and
a spherical plain bearing is provided between each of the plurality of blades and the respective coupling members.

* * * * *